United States Patent [19]

Grene

[11] Patent Number: 4,785,578
[45] Date of Patent: Nov. 22, 1988

[54] PLANT GROWING FRAME

[75] Inventor: Soren Grene, Lunde, Denmark

[73] Assignee: G.W.A. Kaars Sijpesteijn, Ontario, Canada

[21] Appl. No.: 6,356

[22] Filed: Jan. 12, 1987

Related U.S. Application Data

[63] Continuation of Ser. No. 711,581, filed as PCT DK84/00054 on Jun. 13, 1984, published as WO85/00089 on Jan. 17, 1985, abandoned.

[30] Foreign Application Priority Data

Jun. 20, 1983 [DK] Denmark .................. 2823/83

[51] Int. Cl.⁴ .................. A01G 9/02; A47G 29/00
[52] U.S. Cl. .................. 47/86; 211/71
[58] Field of Search .................. 47/85–87, 47/73, 74, 77, 63, 65; 211/71, 88

[56] References Cited

U.S. PATENT DOCUMENTS

| 191,806 | 6/1877 | Loskamp | 47/86 |
|---|---|---|---|
| 695,484 | 3/1902 | Parker | 47/86 |
| 1,947,933 | 2/1934 | Fante | 211/71 X |
| 2,022,548 | 11/1935 | Otwell | 47/86 |
| 2,282,661 | 5/1942 | Lewis | 211/71 X |
| 2,870,575 | 1/1959 | Weber | 47/85 |
| 3,938,281 | 2/1976 | Ingerstedt et al. | 47/86 |
| 3,971,160 | 7/1976 | Vajtay | 47/84 |
| 4,008,543 | 2/1977 | Vilt | 47/86 X |
| 4,453,344 | 6/1984 | Van Wingerden . | |

FOREIGN PATENT DOCUMENTS

| 2637723 | 2/1978 | Fed. Rep. of Germany | 47/39 |
|---|---|---|---|
| 962699 | 6/1950 | France | 47/85 |
| 79225 | 2/1961 | France | 47/87 |
| 2493272 | 5/1982 | France | 47/86 |
| 2559998 | 8/1985 | France | 47/39 |
| 1426313 | 2/1976 | United Kingdom . | |
| 1592650 | 7/1981 | United Kingdom | 47/39 |
| 2153196 | 8/1985 | United Kingdom . | |

OTHER PUBLICATIONS

Luftbeskarning av plantrotter. Ett plantodlingssystem for plantro odlade i mineralull. Goran Orlander & Pelle Gemmel. Interna Rapporter 1979–1.Inst.f.Skogsskotsel, Sveriges Lantrbuksuniversitet.

Primary Examiner—Robert A. Hafer
Assistant Examiner—Danton D. DeMille
Attorney, Agent, or Firm—Murray and Whisenhunt

[57] ABSTRACT

A plant growing frame for securing a number of form-stable growing medium blocks so that, after they are placed in the frame, they are mutually separated by air spaces running from under the bottom and up between and over the growing medium blocks to control root growth out of the blocks by root air pruning and thereby prevent root growth from one block to another. The frame includes a planar network of criss-crossing horizontally extending spaced double rib members defining a plurality of vertically extending open ended block-receiving openings for receiving the blocks therein and a plurality of air-passage forming openings. The space between the double rib members defines the block-receiving openings and the space between each rib of the double rib members defines the air passage forming openings. The air passage forming openings encircle each block receiving opening and separate each block receiving opening from all neighboring block receiving openings.

15 Claims, 1 Drawing Sheet

PLANT GROWING FRAME

This application is a continuation, of Ser. No. 711,581, filed as PCT DK84/00054 on Jun. 13, 1984, published as WO85/00089 on Jan. 17, 1985, now abandoned.

The invention concerns a plant growing frame, in which a certain number of mutually separated small plants can be held tight, cultivated, and handled.

BACKGROUND OF THE INVENTION

Frames or lean-tos in which a certain number of small plants can be held tight, cultivated and handled are known. To get a mutual separation of the root systems of each small plant, every root system of the plants is sideways surrounded with a wall, which hinders root graft. These walls constitute a container around the root system of every plant and these containers can be mutually joined together to a frame or be placed in a lean-to, so a suitable number of plants can be handled in one flow of work, either by hand or machine. Each container can be filled with a suitable, comminuted growing medium, for instance, sphagnum, sand, granulated stonecrop or mixtures of these materials. The container wall, which surrounds each root system of the plants, has a forming effect on the roots of the plants because their growth is forced to follow the walls and may be the bottom. This forming effect has an unwanted effect on the root system of the plants and is called root deformation. The root deformations grow with increasing growing time in a container of a certain size. Root deformations are especially known in the production of container plants for use in forestry. These plants have bad wind firmness, hampered root growth or even cause root strangulation.

According to the invention the plant growing frame is peculiar because each growing medium of the plants is held tight in a way so they are mutually separated by an air space. To reach the wanted effect one can use form stable blocks as growing medium, for instance, rock wool, foam plastic or another suitable porous material, so that a container wall which, as mentioned, will deform the root system, can be omitted.

The air space between each growing medium block will hinder mutual graft of each root system of the plants, because the root tips will stop growing when they meet with the air space, and growth is initiated by the new root tips in the inner part of the system. This prodes, air-pruning, will repeat itself continuously until the plant with the growing medium block will be transplanted on the permanent habitat. At the same time of the transplanting, near the exterior sides of the growing medium block, active root tips will immediately grow out in the surrounding earth.

A decisive condition of the air-pruning effectively will hinder root graft from one growing medium block to another is that the air spaces are made in a way so that air can move freely under the bottom of the plant frame and vertically up between the growing medium blocks on all sides and allow air to pass between the growing medium blocks.

If the plant growing frame, out of consideration for its horizontal joining hinders such a free air movement, the comparative moisture of the atmosphere between the growing medium blocks will be so high that root graft will take place between the growing medium blocks themselves. This will decisively reduce the vitality of the plants, when they are separated and transplanted, because the plants by separated will loose a lot of their root system, in particular the part which is grown out into the surrounding growing medium blocks.

The plant growing frames known from British patent specification No. 1,426,313 are identical with those plant growing frames known from American patent specification No. 3,038,281, which all are characterized in that in the bottom the plant growing frame absolutely stop the vertical air movement between the growing medium blocks, because these plant growing frames are closed in the bottom between the growing medium blocks. The systems have also been given up because of the widespread root graft between the growing medium blocks.

The plant growing frame known from American U.S. Pat. No. 3,971,160 is different from the present invention because it does not use air-pruning at all. The transparent bag, which surrounds the plant growing frames will result in a high comparative moisture of the atmosphere so air-pruning will not take place. That is why the plant growing frame, according to the patent specification is made with vertical walls in the bottom between the growing medium blocks, so these walls hinder root graft. This plant growing frame is also closed in the bottom between the growing medium blocks.

As it appears from the above mentioned, the plant growing frame is decisively different, according to the patent specification from the present plant growing frame, which according to the invention is made in a way so it with air-pruning alone, achieved with an absolutely free air movement between the growing medium blocks effectively hinders root graft between the growing medium blocks themselves.

Hereby one achieves that the transplanted plant with all its root system quickly establishes itself on the permanent habitat with a quite natural root form without root deformations.

Therefore, the application still is said to concern a patentable invention.

A typical use of the plant growing frame according to the invention will be for production of trees for transplanting in woods. The plant growing frame will for a typical two-year nursery period held tight the growing medium blocks so they in all stages from direct seeding, growing, sorting and clearing up for delivering in the woods, are mutually separated of the air space, which will secure the wanted air-pruning of the root systems. The plant growing frame out of consideration for an effective handling will be used to transport the plants out in the wood to the habitat, where the plant with the growing medium block will be removed from the plant growing frame and transplanted, and out of the growing medium blocks and out in to the earth.

SUMMARY OF THE INVENTION

According to the invention the plant growing frame of the mentioned kind is characterized by that the growing medium blocks are held tight by certain members in the plant growing frame, so that the blocks sideways are mutually separated by an air space, which runs from under the bottom of the growing medium blocks and continues vertically up between the blocks on all sides and up above the blocks. The air space must have a width that the comparative moisture of the atmosphere of the air space by the free air movement, under certain growing conditions can be held so low, that the air-pruning of the root systems is effective. It is a characteristic that the members which secure the growing medium blocks only touch a small part of the sides of the growing medium blocks, bottom and surface, so as not to cause any root deformation. It is also characteristic that the securing members in the growing frame are able to secure the growing medium block so securely that, irrespective of whatever influences the growing frame in connection with common handling, it is possible with a steady pull with the hand to remove the growing medium blocks separately in the connection with transplantation, sorting or transplanting.

A particular easy plant growing frame is, according to the available invention, characterized by the members which secure the growing medium blocks being made out of consecutive ribs or bands crisscrossing in the frame which constitutes a network, which is placed horizontally in the frame. The links in this network are so that they have a shape and size, which correspond to the horizontal cross section of the growing medium blocks and the wanted air space. To further secure of the growing medium blocks one or several small prongs for each block can be placed on the double ribs or bands, or the ribs/bands can be suitably roughened.

BRIEF DESCRIPTION OF THE DRAWINGS

The plant growing frame according to the invention is shown in two embodiments, as described below with reference to the accompanying drawing in which.

DETAILED DESCRIPTION OF THE INVENTION

Figure 1:
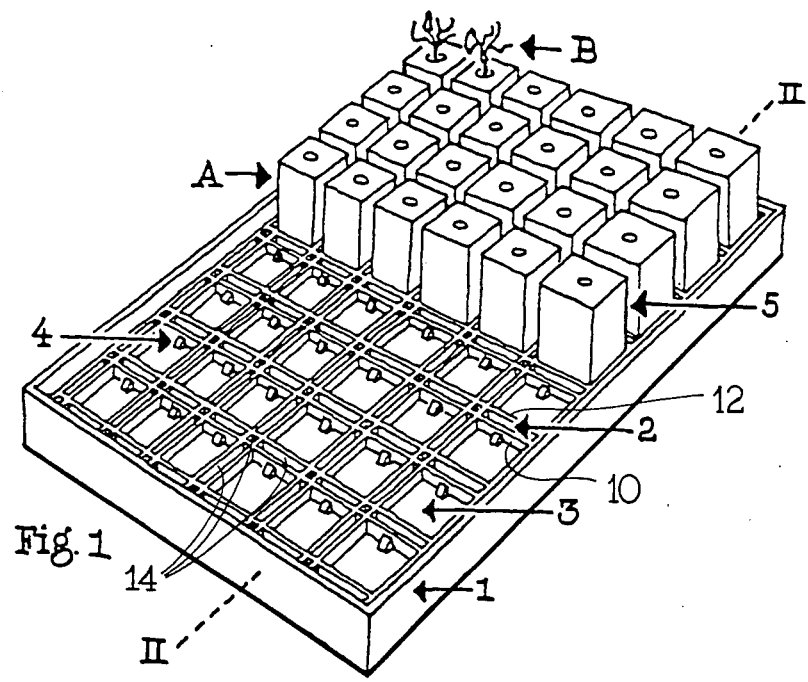
FIG. 1 shows the plant growing frame in perspective

The available invention can be made in a lot of different embodiments of which the chosen possibilities as mentioned are shown on the drawing. The figures on the drawing are parts with the same function described with the same reference description, even though the embodiments can be different. The invention concerns only these subjects which are described with numbers, while the subjects, which are described with letters are already known and only mentioned here to understand the drawing better.

Figure 2:
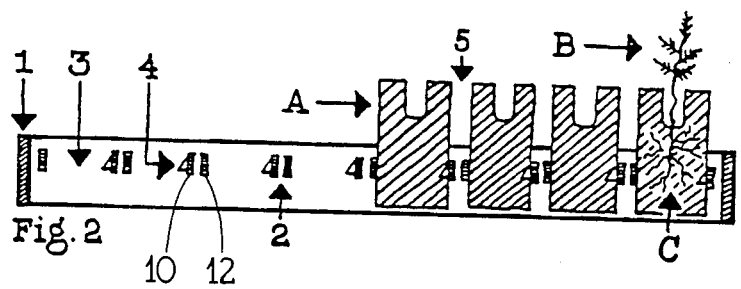
FIG. 2 shows a vertical section along the line II–IV in FIG. 1

The plant growing frame consists of a frame 1, in which a network 2 is formed. In FIG. 1 and FIG. 2 the network 2 is made as double ribs, whose vertical extent only is a fraction of frame 1. The ribs or the network 2 are held tight to the frame 1 on the level near the vertical centre of the frame. Further, the ribs/network 2 in FIG. 1 and FIG. 2 is divided so that, as seen from above, some links are made, which in size and shape fit the form stable growing medium blocks A, which are chosen for the purpose, so the growing medium blocks A can be secured. To make the securing more effective the ribs/network 2 can be made with one or several prongs 4 per link 3. The double ribs in the network serve the purpose, that between the suitable links for the growing medium blocks A, there are links with another dimension on which ensure that, between the growing blocks, there is an air space 5 of such a size (width) that air-pruning of the root system C of the plants B will be effective. Out of consideration for clearness the plant growing frames in all three figures are just partly filled with growing medium blocks A, and a number of these are filled with plants B and on FIG. 2 shown with a root system C.

Figure 3:
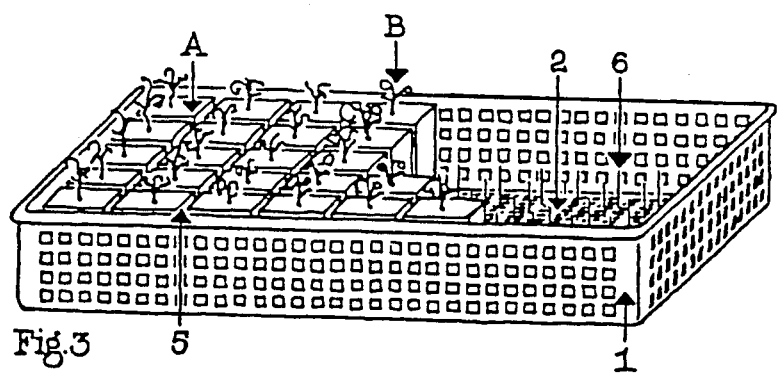
FIG. 3 shows the plant growing frame in perspective in another embodiment.

In FIG. 3 another embodiment is shown when the network 2 forms the bottom in the frame 1. To secure each growing medium block A the network/bottom 2 is made with some vertically standing nails or sticks 6. The nails or sticks 6, of which there has to be at least one per growing medium block, can be made with a form or roughness, which makes the nail able to secure the growing medium blocks A effectively, after the blocks A have been placed over the nails 6.

An easy way to produce both embodiments would be to die cast them in plastic, even though other embodiments are not excluded.

It is characteristic that both embodiments and others as well serve two purposes,
1. to secure the growing medium blocks with mutual sideways air seperation during the growing period;
2. to make it possible to handle a suitable number of plants with a single grab, so all handling and transport work from sowing to growing and finally the transplanting can be more effective.

In the drawing in FIG. 1 a plant growing frame is shown with room for 48 growing medium blocks A and in FIG. 3 for 40 blocks. The number of growing medium blocks are abitrarily chosen. In the practical situation the growing medium frames will be made to a certain specification with a number of growing medium blocks A, which one will find suitable for purposes of growing and handling. The plant growing frames can be made with certain features which make the frame suitable for handling by hand or machine, for instance, handles, holes, projec-tions etc. in the plant growing frame. Such handling features are not shown on the drawing because the embodiments can be numerous.

I claim:

1. In combination, a plurality of formstable blocks of plant growing substrate and a frame supporting said blocks therein in spaced relation to control root growth out of said blocks by root air pruning and thereby prevent root growth from one block to another;

each said block having a top, a bottom and side surfaces, said top, bottom and side surfaces being penetrable by roots to thereby enable air pruning to occur;

said frame comprising a planar network of crisscrossing horizontally extending spaced double rib members defining a plurality of air-passage-forming openings and a plurality of vertically extending open-ended block-receiving openings for receiving said blocks therein, the space between said double rib members defining said block-receiving openings and the space between each rib of said double rib members defining said air-passage-forming openings, said air-passage-forming openings encircling each block-receiving opening and separating each block-receiving opening from all neighboring block-receiving openings by said air-passage-forming openings;

said rib members defining said block-receiving openings having planar surfaces for frictionally engaging portions of said side surfaces of said blocks to securely hold said blocks in said block-receiving openings to that said blocks do not fall out of said block-receiving openings during handling of said frame, with the entirety of said side surfaces of each said block being spaced from side surfaces of all neighboring blocks;

vertical air passages defined between the spaced side surfaces of neighboring blocks and extending vertically through said air-passage-forming openings, whereby said vertical air passages extend vertically upward along the entire height of each block to its top;

said vertical air passages completely encircling each block and isolating each block from other blocks by an air space which is of a size sufficient to control root growth out of the blocks by air pruning and prevent root growth between one block and another;

said portions of said side surfaces which said planar surfaces of said rib members securely engage comprising only a small fraction of the surface area of said side surfaces of the block so that a remaining greater fraction of the surface area of said side surfaces is open to said vertical air passages; and said blocks being securely supported in said frame with an air space under the bottom of each block in communication with said vertical air passages so that the bottom of said block is open to the vertical air passages and air may flow uninterrupted from the air space under the bottom of each block, upward along said side surfaces of each block via said vertical air passages to the top to promote air pruning.

2. The combination of claim 1 wherein said rib members have a height which is substantially less than the height of the side surfaces of the blocks to assist in maximizing the surface area of the side surfaces of the blocks open to the air passages.

3. The combination of claim 1 including prong means on said rib members extending into the block-receiving openings for engaging side surfaces of blocks received therein and removably retaining blocks therein.

4. The combination of claim 1 wherein the blocks have a horizontal cross-section corresponding to that of the block-receiving openings.

5. The combination of claim 1 wherein said blocks are sized to be received in force-fit relation in the block-receiving openings.

6. The combination of claim 1 wherein the frame includes support means for supporting the rib members with lowermost portions of the rib members at a height vertically above that of lowermost portions of the support means.

7. The combination of claim 6 wherein said support means comprises peripheral side members, said peripheral side members defining vertically-extending air-passage-forming peripheral openings extending along the peripheral side members between the peripheral side members and rib members adjacent thereto whereby peripheral vertical air passages are defined between the peripheral side members and neighboring blocks thereto through the air-passage-forming peripheral openings.

8. The combination of claim 1 wherein said double rib members comprise a first set of parallel double rib members and a second set of parallel double rib members perpendicular to the double rib members of the first set.

9. The combination of claim 8, wherein the ribs of each pair located closely adjacent each other are spaced from each other by a first distance defining the air-passage-forming openings therebetween, and the rib members of each pair are spaced from adjacent parallel rib members of neighboring parallel pairs by a second distance greater than said first distance, said block-receiving openings comprising square openings with each side thereof of a length equal to said second distance.

10. The combination of claim 1 wherein said block-receiving openings are square.

11. The combination of claim 1 wherein said rib members comprise thin, vertically-orientated planar members.

12. A plant growing frame, comprising:

securing means for securing a number of form-stable blocks of growing medium so that said blocks are separated on all sides by an air space, said securing means providing for securing of said blocks such that said air space is maintained uninterrupted from under the bottom and vertically up between and over said form-stable blocks to isolate one block from another by respective intervening air spaces, each intervening air space being of a size sufficient to control root growth out of the block by air pruning and thereby prevent root growth between one formstable block and another, said securing means comprising:

a planar network of criss-crossing horizontally extending spaced double rib members defining a plurality of air-passage-forming openings and a plurality of vertically extending open-ended block-receiving openings for receiving said blocks therein, the space between said double rib members defining said block-receiving openings and the space between each rib of said double rib members defining said air-passage-forming openings, said air-passage-forming openings encircling each block-receiving opening and separating each block-receiving opening from all neighboring block-receiving openings by said air-passage-forming openings;

said rib members defining said block-receiving openings having planar frictional surfaces for frictionally engaging portions of said side surfaces of said blocks to securely hold said blocks in said block-receiving openings so that said blocks do not fall out of said block-receiving openings during handling of said frame.

13. A frame as claimed in claim 12, including peripheral support members on each side thereof to which terminal ends of said rib members are coupled, said support members supporting the network with the lowermost portions of said rib members spaced above lowermost portions of the support members.

14. A frame as claimed in claim 13, including vertically-extending air-passage-forming peripheral openings defined along the peripheral support members between the peripheral support members and rib members adjacent thereto to separate block-receiving openings neighboring the peripheral support members from the peripheral support members.

15. A frame as claimed in claim 12, including prong means on the rib members extending into the block-receiving openings for engaging blocks received therein and removably retaining blocks therein.

* * * * *